Patented Sept. 26, 1939

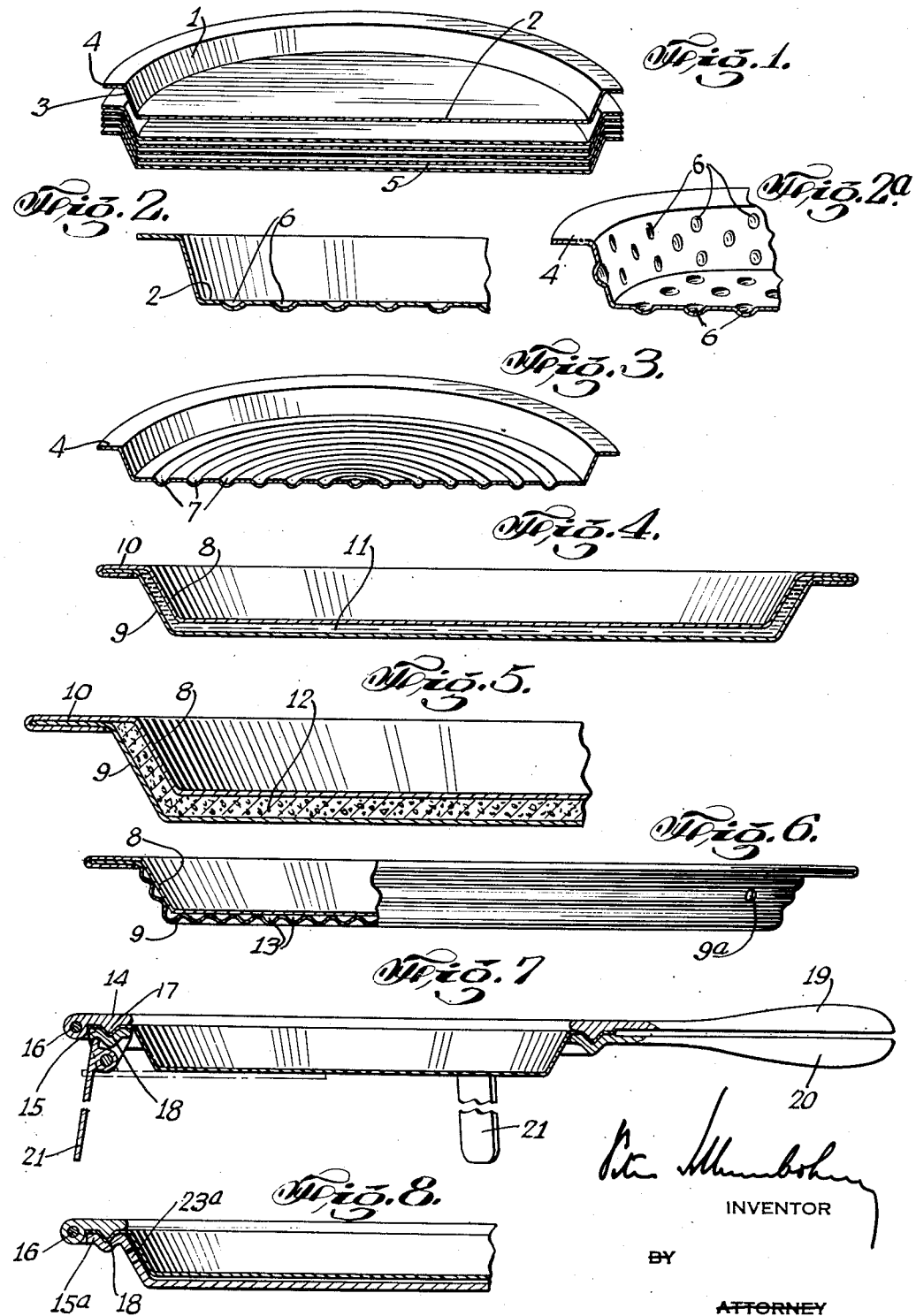

2,174,425

UNITED STATES PATENT OFFICE 2,174,425

COOKING UTENSIL

Peter Schlumbohm, New York, N. Y.

Application August 9, 1937, Serial No. 158,045

1 Claim. (Cl. 53—7)

My invention relates to cooking utensils and more specifically to a frying pan.

Following my invention the frying pan is made from metal foil and is designed to be used only once and to be thrown away thereafter. As most suitable material for making the frying pan I found to be aluminum foil of about $\frac{1}{10}$ mm. thickness.

The invention is illustrated by way of example, partly in section, partly in perspective in the Fig. 1–Fig. 8 of the accompanying drawing.

Fig. 1 shows a set of six foil frying pans as they would be packed for creating a handy sales unit.

Figs. 2, 2a and 3 illustrate by cross section certain surface features of the foil pan as described below.

Figs. 4, 5 and 6 illustrate a type of double walled foil frying pan.

Fig. 7 illustrates a frame for holding a foil pan.

Fig. 8 illustrates an ordinary heavy metal frying pan with special equipment for holding a foil pan as an insert.

I am aware of the fact that parchment paper has been suggested and is in common use for boiling foods wrapped up therein and placed into boiling water. Paper however would not be suitable for the special purpose of frying goods. Furthermore it is known to use in the laboratory crucibles made from thin platinum; but those crucibles are designed for permanent use and the thinness of the material is merely a concession to the price of the expensive material and has no functional meaning. Also it has been proposed to make military food containers, forming part of the equipment of the single soldier for receiving his food ration, from thin noncorrosive steel, so that the container might be folded to save space when not in use.

All this known equipment, however, does not anticipate my invention, and it does neither aim at the purpose of the present invention nor does it show the features of the instruments as invented by me for the purpose of my invention which is:

To create a labor saving device for the housewife in the form of a frying pan to be used once and to be thrown away, thus eliminating the necessity of cleaning the pan;

To create a frying pan which is superior in its quality, as far as the frying effect is concerned, to the usual equipment;

To create a frying pan which may be thrown away in a convenient form, which may be torn by hand to small pieces or may be crushed like paper but with the additional advantage of not unbending from the crushed small size of a ball;

To create a frying pan which has enough eye appeal and enough stability and rigidity to be used as a plate for serving the food on the table after having fried the food therein first, thus also eliminating the necessity of cleaning the table dish;

And to create a frying pan which offers with its highly polished surface, which is not damaged by any prior frying use as it is the case in normal frying pans, the advantage of "non-sticking" and of a smoother frying process.

I found that a highly polished metal foil like aluminum foil used as frying pan shows very convenient thermal effects in conducting the heat of the heating flame to the foods to be fried, probably due to the lack of radiant heat being taken in from the flame and being sent out to the food as well known consequence of the highly polished surfaces. The frying effect of such a mirrored foil pan shows a special characteristic of the frying process, which by the majority of test persons was found to be superior to the results of normal thick and non-shining frying pans. The tests were made in frying eggs, quite a sensible product and a product with a well comparable standard taste.

As practically all the heat is transferred by conductivity alone, special care has to be taken to provide an equal distribution of the frying fat. Following my invention I create a foil frying pan with good frying properties by providing a good rigidity. Such a rigidity may either be obtained—as shown in Fig. 1—by stamping the foil pan 1 with its bottom 2 being held straight by a conical edge 3 and by re-enforcing the edge 3 by a flange 4. This will cause a sufficient rigidity of the bottom 2 to allow an equal distribution of the frying fat, for instance, when placed on the earthenware part of the electrical resistance wire heating plates.

A better way for increasing both rigidity and equal distribution of the frying fat is shown in Figs. 2, 2a and 3. Recesses 6 or concentric grooves 7 show good results in this respect.

The pan must not be necessarily round; following my invention there is even a special advantage in making the foil pan in the form of a circle segment if it is intended to insert three or four of such segments into a round standard pan for the purpose of cooking different foods in the various segments.

The improvements as illustrated in Figs. 4, 5 and 6 relate to the type of double walled frying pans as known by themselves. In making them out of metal foil, the aforementioned all-conductivity heat transfer may be slowed down by either providing a liquid 11 with a high boiling point, e. g. a paraffin, between the double walls 8 and 9 or by providing in that space a dry material 12 with a small heat conductivity, e. g., glass wool, or simply to provide an airspace 13 by undulating one of the two walls, e. g., wall 9 in Fig. 6. The outer wall 9 is provided with a hole 9a so that the air may escape when expanding under the influence of the heating. The two foils 8 and 9 may be joined together by an overlapping joint 10.

A special instrument designed to hold the foil pan for instance over an open fire at a picnic is shown in Fig. 7. Two congruent rings 14 and 15 are equipped with a hinge 16 and the two halfs 19 and 20 of a handle are joined to ring 14 and to ring 15 respectively. A groove 18 in ring 15 and a tongue 17 in ring 14 are adapted to hold the flange 4 of a foil pan as shown in Figs. 1–3 or accordingly the flange 10 as shown in Figs. 4 and 5. Hinged legs 21 may complete this hiking equipment.

The special instrument as illustrated in Fig. 8 differs from the instrument as shown in Fig. 7 by providing a solid thick frying pan 15a as bottom, the flange of which functions like ring 15 in Fig. 7 does by bearing a hinge 16 and the groove 18. The foil pan fits closely into the bottom pan. A hole 23a allows air to escape during the heating.

In speaking of aluminum I include aluminum alloys as sutable for making foil.

Having now described the nature of my invention and having indicated by way of examples the manner in which it may be performed, what I claim is:

A kitchen utensil comprising in combination a rigid supporting element for repeated use and a metal foil element for temporary use, said metal foil element forming a container for the food to be treated and said rigid element being adapted to support said metal foil container by means of a double frame with a lower and an upper edge, said lower and upper edges being adapted to hold a part of said metal foil between them in a fixed position.

PETER SCHLUMBOHM.